UNITED STATES PATENT OFFICE.

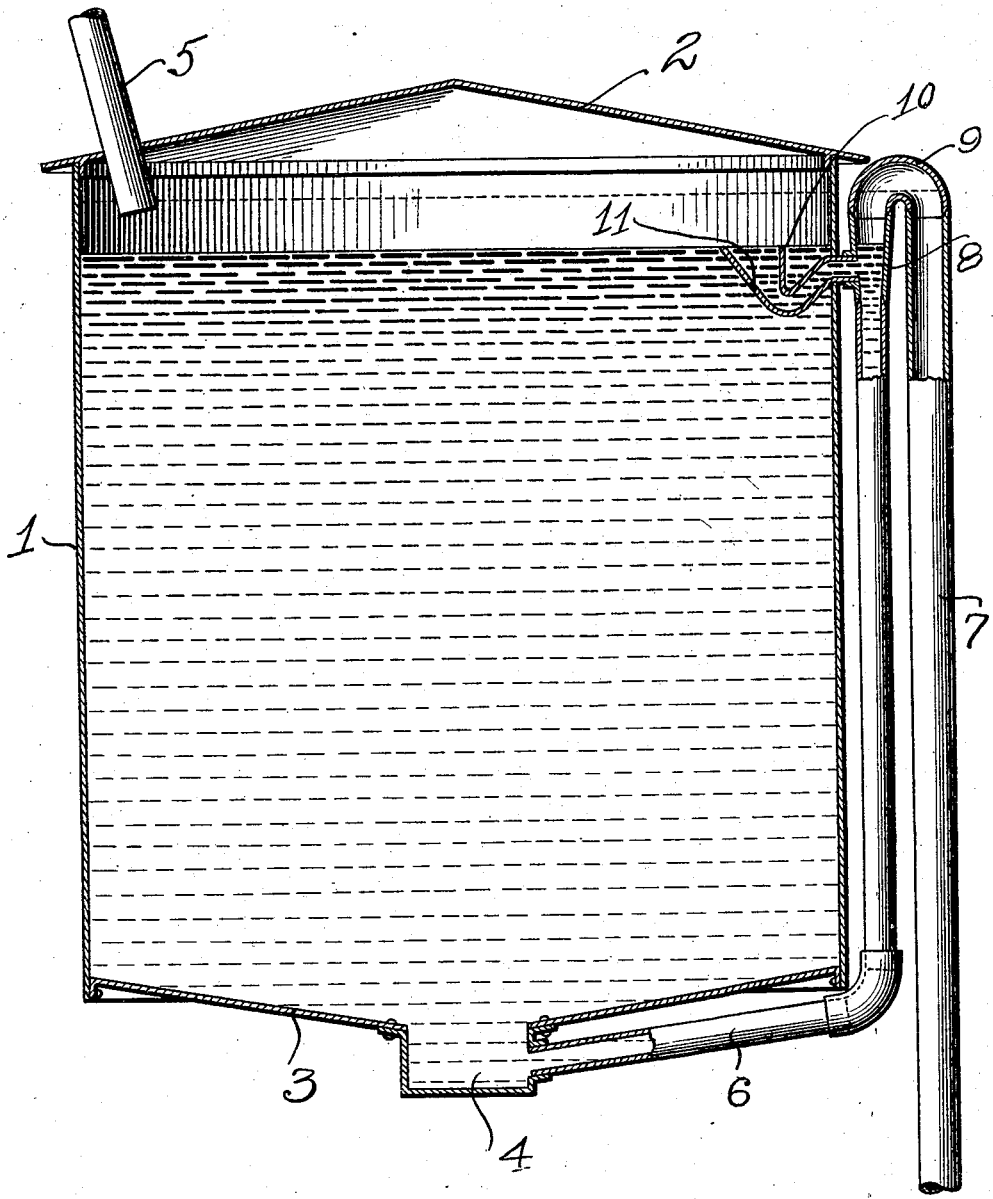

ROBERT A. DITTRICK, OF FORT MYERS, FLORIDA.

SELF-CLEANING SANITARY CISTERN.

1,188,159.  Specification of Letters Patent.  Patented June 20, 1916.

Application filed January 26, 1916. Serial No. 74,385.

*To all whom it may concern:*

Be it known that I, ROBERT A. DITTRICK, a citizen of the United States, residing at Fort Myers, in the county of Lee and State of Florida, have invented certain new and useful Improvements in Self-Cleaning Sanitary Cisterns, of which the following is a specification.

This invention relates to water tanks or the like, and particularly to means for keeping such tanks in a sanitary condition at all times.

The primary object of the invention is to provide means which will be automatically controlled by the height of the water in the tank to enable the tank to be self-cleaning.

One characteristic of the invention consists in draining the tank from both the top and the bottom to carry off the floating debris and the sediment contained in the bottom of the tank, to which end, the invention embodies means for inducing siphonic action and to so construct means for inducing this action that it will carry off the floating debris through a skimmer trap located below the highest level which the water reaches in the tank and carry off the sediment contained in the bottom of the tank from a mud drum or well which is located in the bottom of the tank and connected to the skimmer trap by a suitable suction pipe, which is connected to a discharge pipe.

Another characteristic of the invention consists in locating the skimmer trap at a height in the tank below the highest level which the water reaches in the tank to determine the volume of water which is to be carried off during the siphoning, to which end, one feature of the invention consists in so constructing the skimmer trap that when the water reaches its level the air will be permitted to reach the suction pipe and break the siphon, and thereby stop the discharge of water.

Another characteristic of the invention consists in so locating the suction pipe and the discharge pipe with respect to the highest level that the water reaches in the tank that the necessary siphoning action will be induced, to which end, another feature of the invention consists in constructing the suction pipe and the discharge pipe with a height sufficient to reach the highest level which the water may reach in the tank, and by means of the skimmer trap, which may also act as a primer for starting the siphoning, so located with respect to the suction pipe to create the necessary suction and induce the siphonic action.

Another characteristic of the invention consists in so constructing the discharge pipe that it will drain the mud drum with sufficient force to carry off the sediment, to which end, another feature of the invention consists in constructing the discharge pipe of a diameter sufficient to accommodate both the discharge of water from the mud drum and the skimmer trap.

Another characteristic of the invention consists in constructing the skimmer trap in such a manner as to prevent insects from getting into the tank through the discharge pipe, to which end, another feature of the invention consists in constructing the skimmer trap with an intermediate portion having a dip lower than its respective ends and in which a sufficient amount of water is adapted to be present at all times to provide an insect barrier.

In the preferred realization of the above features, it is preferred that the water tank be constructed with a funnel shaped bottom terminating into a mud drum; however, this particular feature is not absolutely necessary to accomplish the results of the invention.

The invention will be fully understood upon reference to the accompanying drawing which illustrates a vertical section of the water tank showing the application of the invention.

Referring to the drawing in detail, 1 represents a tank which may have a suitable cover 2 and a funnel shaped bottom 3, terminating into a well or mud drum 4. The tank is further provided with a source of water supply such as the pipe 5. With the tank thus constructed, and in order that it may be self-cleaning and kept in a sanitary condition, the mud drum is connected to a suction pipe 6 which is adapted to extend to a height substantially to that of the highest level that the water reaches in the tank from whence it extends downward and provides a discharge pipe 7 which is of greater diameter than the suction pipe 6 in order to create a sufficient suction to carry off whatever sediment may be deposited in the mud drum 4. In order to connect the suction pipe 6 to the discharge pipe 7, a suitable reducer 8 is employed, and in order that the discharge pipe 7 may be projected downward from the suction pipe 6, a suitable elbow 9 is employed. To induce the necessary siphonic action, a primer 10 is connected to the suction pipe at any desired location in the tank, according to the volume of water which is desired to be drawn off in cleaning the tank. This primer 10 embodies in its construction a pipe having a diameter at its point of connection to the suction pipe of less diameter than the suction pipe at the point where it connects thereto, which pipe has a low intermediate portion and an outwardly flaring mouth portion. When the water reaches a level in the tank above the primer 10, air will be forced from the top part of the suction pipe to the discharge pipe and the necessary suction created to start the siphoning, then the primer 10 becomes a skimmer trap and is adapted to carry off the top stratum of the water, and whatever floating debris that is contained therein. The mud drum will be simultaneously emptied of sediment through the suction pipe 6. When the water recedes to a level of that of the skimmer trap, air will be allowed to pass through the skimmer trap and break the suction. In order to provide a barrier to prevent insects from getting into the tank through the pipes, an opening 11 is provided in the skimmer trap which allows the water to drip in to the low intermediate portion of the skimmer trap and seal the same.

I claim:—

1. In a water tank the combination of siphoning means adapted to drain the top and bottom stratums of the water contained in the tank when the water reaches an abnormal height in the tank, said means embodying in its construction a primer adapted to induce the siphonic action and remove the top stratum of the water contained in the tank.

2. In a water tank the combination of siphoning means adapted to drain the top and bottom stratums of the water contained in the tank when the water reaches an abnormal height in the tank, said means embodying in its construction a primer adapted to remove the top stratum of the water contained in the tank and constructed to determine the volume of water to be drained from the tank.

3. In a water tank the combination of siphoning means adapted to drain the top and bottom stratums of the water contained in the tank when the water reaches an abnormal height in the tank, said means comprising a suction pipe connected to the bottom of the tank and extending to a height substantially to the highest level that the water reaches in the tank, a primer extending from said suction pipe into the tank adapted to induce siphonic action when the water reaches an abnormal height in the tank and adapted to break the siphoning when the water recedes to a normal height in the tank.

4. In a water tank the combination of siphoning means adapted to drain the top and bottom stratums of the water contained in the tank when the water reaches an abnormal height in the tank, said tank having a mud drum and said siphoning means embodying in its construction a suction pipe connected to the bottom of the tank and extending to a height substantially to the highest level that the water reaches in the tank, and thence down to provide a discharge pipe, a primer extending into the tank from the suction pipe adapted to induce siphonic action when the water reaches an abnormal height in the tank and adapted to carry off the top stratum of the water when the siphonic action is induced, said discharge pipe having a diameter sufficient to accommodate the discharge of water from both the mud drum and the primer.

5. In a water tank, the combination of siphoning means comprising a suction pipe connected to the bottom of the tank and extending to a height substantially to the highest level that the water reaches in the tank, and thence downwardly to provide a discharge pipe, a primer connected to the suction pipe and extending into the tank and adapted to induce siphonic action when the water reaches an abnormal height in the tank, said primer also adapted to carry off the top stratum of the water after the siphoning action has been induced, said discharge pipe being of a diameter sufficient to accommodate the discharge of water from both the bottom of the tank and the skimmer trap, and said skimmer trap embodying in its construction, a low intermediate portion adapted to contain water when the tank recedes to a level below that of the skimmer trap.

The foregoing specification signed at Fort Myers, Florida, this 19th day of January, 1916.

ROBERT A. DITTRICK.

Copies of this patent may be obtained for five cents each, by addressing the "Commissioner of Patents, Washington, D. C."